(12) United States Patent
Ben-Bassat

(10) Patent No.: US 9,940,900 B2
(45) Date of Patent: Apr. 10, 2018

(54) PERIPHERAL ELECTRONIC DEVICE AND METHOD FOR USING SAME

(71) Applicant: INUITIVE LTD., Ra'anana (IL)

(72) Inventor: David Ben-Bassat, Ganey Tikva (IL)

(73) Assignee: INUITIVE LTD., Ra'anana (IL)

( * ) Notice: Subject to any disclaimer, the term of this patent is extended or adjusted under 35 U.S.C. 154(b) by 0 days.

(21) Appl. No.: 15/023,762

(22) PCT Filed: Sep. 8, 2014

(86) PCT No.: PCT/IL2014/000044
§ 371 (c)(1),
(2) Date: Mar. 22, 2016

(87) PCT Pub. No.: WO2015/040608
PCT Pub. Date: Mar. 26, 2015

(65) Prior Publication Data
US 2016/0217767 A1   Jul. 28, 2016

Related U.S. Application Data

(60) Provisional application No. 61/880,930, filed on Sep. 22, 2013.

(51) Int. Cl.
*G09G 5/00* (2006.01)
*G06F 3/033* (2013.01)
*G09G 5/08* (2006.01)
*G06F 3/01* (2006.01)
*G06F 3/038* (2013.01)
(Continued)

(52) U.S. Cl.
CPC .............. *G09G 5/08* (2013.01); *G06F 3/012* (2013.01); *G06F 3/013* (2013.01); *G06F 3/017* (2013.01); *G06F 3/038* (2013.01); *G06F 3/03543* (2013.01); *G06F 3/167* (2013.01)

(58) Field of Classification Search
CPC .... G06F 3/04812; G06F 3/013; G06F 3/0416; G06Q 30/02
See application file for complete search history.

(56) References Cited

U.S. PATENT DOCUMENTS 5,367,315 A   11/1994 Pan
2010/0103127 A1*  4/2010 Park .................... G06F 3/04886
345/173
(Continued)

FOREIGN PATENT DOCUMENTS

WO   2012145180 A1   10/2012

*Primary Examiner* — Nan-Ying Yang
(74) *Attorney, Agent, or Firm* — Browdy and Neimark, PLLC

(57) ABSTRACT

A peripheral electronic device is described which is configured to communicate with a computing device comprising a display having a screen configured to display a virtual gaze cursor; wherein the peripheral electronic device comprises at least one user interface configured to trigger at least one operational command in response to interaction with a user, wherein the at least one operational command is associated with a current location of the virtual gaze cursor at the screen, and wherein a change at the current location of the virtual gaze cursor being displayed, is determined based on a shift of a user's gaze from a first location at said screen to a different location thereat, or based on a tilt of the user's head, or based on any combination thereof.

16 Claims, 2 Drawing Sheets

(51) Int. Cl.
    *G06F 3/0354*    (2013.01)
    *G06F 3/16*    (2006.01)

(56) References Cited

U.S. PATENT DOCUMENTS

| | | |
|---|---|---|
| 2011/0205148 A1 | 8/2011 | Corriveau et al. |
| 2012/0131491 A1 | 5/2012 | Lee |
| 2012/0272179 A1* | 10/2012 | Stafford .................. G06F 3/012 715/781 |
| 2013/0027302 A1 | 1/2013 | Iwaizumi et al. |
| 2013/0093674 A1* | 4/2013 | Fei .......................... G06F 3/033 345/158 |
| 2014/0164756 A1* | 6/2014 | Huang .................... G06F 3/012 713/100 |
| 2014/0361971 A1 | 12/2014 | Sala |
| 2015/0042552 A1 | 2/2015 | Tsoref |

\* cited by examiner

PERIPHERAL ELECTRONIC DEVICE AND METHOD FOR USING SAME

TECHNICAL FIELD

The present disclosure generally relates to computer systems, and more particularly, to computer systems that have gaze detection capabilities.

BACKGROUND

Eye tracking is the process of measuring either the point of gaze (i.e. where one is looking) or the motion of an eye relative to the head. Typically, an eye tracker is a device used for measuring eye movements and/or positions. There are a number of methods for measuring eye movement. Currently, the most widely used are video-based eye trackers, by which a camera focuses on one or both eyes and records their movement as the viewer looks at some kind of stimulus. Most modern eye-trackers use the center of the pupil and infra red non-collimated light to create corneal reflections. The vector between the pupil center and the corneal reflections may be used to compute the point of regard on surface or the gaze direction.

Eye tracking setups vary greatly; some are head-mounted, some require the head to be stable (for example, with a chin rest), and some function remotely and automatically track the head during motion.

The eye tracking technology is used in various fields. For example for detecting a gaze of a driver of a vehicle in order to assist the driver's driving (e.g. for determining whether or not the driver is driving inattentively).

Another known technique is detecting movement of a pupil of a wearer of a head-mounted device, and determining, based on the detected movement, inputs to a user interface. For example, by using eye gaze detection, the head-mounted device may change a tracking rate of a displayed virtual image based on where the user is looking. Gazing at the center of the field of view may allow for fine movements of the virtual display (e.g. slow scrolling). Gazing near an edge of the field of view, may provide coarser movements (e.g. fast scrolling).

A somewhat similar technology to tracking head movements of a user is a technology which is sensitive enough so that only small head movements are required for the detection, while the user's eyes do not leave the screen.

The mouse is a common peripheral input device of any typical computer system. It can track the user's control motion (usually detected by a trackball or optical detection unit) and the cursor on the screen of the display will be shifted in a way that corresponds to the user's control motion. Besides, the user may select any item on the display or execute commands during word processing or web browsing by clicking the buttons of the mouse device. Typically, when the user presses a button of a mouse device, the button shifts down and triggers an electrical switch on a circuit board inside the mouse device, so the electrical switch is turned on and sends an electrical signal to a connected computer system (either by wire or wirelessly). Then the computer system generates an event associated with the click on the screen of the display corresponding to the electrical signal. After the user releases the button, an open circuit is formed due to disappearance of the pressure. Meanwhile, the button generates a feedback force in response to the foregoing pressure and reverts to its original rest state.

Because the user presses the buttons of the mouse device frequently, the buttons hit the electrical switches very often. The hardness of the button is not high enough so that the button may be sunken or, distorted after hitting the electrical switch for a large number of times. In such a case, the button will not be sensitive as expected, and will have an adverse effect on the user's operation since he/she would have to press the button harder in order to get a successful connection with the electrical switch.

In addition, there are times where a number of operations need to be carried out in a computer system, and having a single cursor implies that they need to be carried out serially, a fact that leads to a too long period of time for the execution of these operations, a period that should preferably be shortened.

SUMMARY OF THE DISCLOSURE

The disclosure may be summarized by referring to the appended claims.

It is an object of the present invention to provide a new device and system to enable carrying operational commands, by relating to the user's gaze and/or head position and orientation with respect to a screen of the computing device.

It is another object of the present invention, to provide a device and system for generating and controlling a virtual gaze cursor that can be moved around a computing device's screen only by gazing thereat.

It is another object of the present invention, to provide a method and device for generating a dual cursor system that comprises a virtual gaze cursor (controlled by the user's gaze) and its associated dedicated gaze click buttons, and a conventional cursor system (controlled by mouse movements), where the two are independent of each other, thereby effectively doubling the amount of cursors which a user may use at a single screen.

Other objects of the present invention will become apparent from the following description.

According to one embodiment, there is provided a peripheral electronic device for use in a computerized system adapted to communicate with a computing device comprising a display that includes a screen configured to display at least one virtual gaze cursor;

wherein the peripheral electronic device comprises at least one user interface configured to trigger at least one operational command (preferably to be executed by the computing device) in response to interaction with a user (e.g. clicking at a button of a mouse, striking a key at a keyboard), wherein the at least one operational command is associated with a current location of the virtual gaze cursor at the screen;

and wherein a change at the current location of the virtual gaze cursor being displayed, is affected based on a shift of a user's gaze from a first location at that screen to a different location thereat, or based on a tilt of the user's head (e.g. a tilt of the user's head may be expressed as a change in the position of the user's head and/or its orientation), or based on any combination thereof.

The term "computing device" as used herein throughout the specification and claims, is used to denote any device to which a peripheral electronic device, such as a mouse, can be connected or be an integral part thereof. For example: a desktop computer, a laptop computer, a smart phone, and the like.

The term "virtual gaze cursor" as used herein throughout the specification and claims, is used to denote a cursor that is configured to move by essentially following the shifting of the user's gaze and/or in accordance with the user's head orientation and position. A virtual gaze cursor may be visible or invisible. It may be displayed as being identical to a standard system cursor, or may have a specialized appearance—in order to differentiate it from a standard system cursor, which may be concurrently operative therewith.

The term "user interface" as used herein throughout the description and claims should be understood to encompass any means that allow interaction between a user and the peripheral electronic device such as a button, a wheel, a key, a joystick and the like.

According to another embodiment, the peripheral electronic device further comprises at least one other user interface (e.g. another button) configured to trigger at least one operational command in response to interaction with a user (e.g. clicking at the button), wherein the at least one operational command is associated with a current location at the screen of a cursor being a different cursor from the virtual gaze cursor.

By yet another embodiment, the movement of the other cursor (i.e. the one being a different cursor from the virtual gaze cursor, e.g. a standard computer cursor) is being carried out by detecting a two dimensional motion of the peripheral electronic device.

In accordance with another embodiment, the triggering of the at least one operational command in response to interaction with a user, is based upon information derived from one or more members of a group consisting of: a microphone configured to capture one or more voice commands, an image capturing device configured to capture one or more gestures of the user's hand and/or finger and/or head, and a timer configured to determine a period of time during which the user's gaze remained fixed at a certain location.

According to still another embodiment, the virtual gaze cursor is displayed at the screen in a graphical form being different from a graphical form at which the other cursor is displayed at the screen (e.g. the virtual gaze cursor is displayed in a graphical form that is different from that of a standard cursor).

By another embodiment, the virtual gaze cursor and the different (other) cursor are operated independently of each other.

In accordance with yet another embodiment, each of the at least one user interface and the at least one other user interface, is configured to trigger at least one operational command that cannot be triggered by the other one of the at least one user interface and the at least one other user interface.

According to another aspect, there is provided a system that comprises:
 a computing device that includes a display having a screen configured to display a virtual gaze cursor;
 a peripheral electronic device adapted to communicate with the computing device, wherein the peripheral electronic device comprises at least one user interface configured to trigger at least one operational command to be executed by the computing device in response to interaction with a user, and wherein the at least one operational command is associated with a current location of the virtual gaze cursor at the screen,
 one or more gaze detection sensors operative to determine a shift in a user's gaze or a change in the user's head orientation and/or position;
 one or more processors operative to:
  receive data from the one or more gaze detection sensors relating to the shift in a user's gaze to a new location at the screen or a change in the user's head orientation and position;
  receive data from the user interface that relates to the at least one operational command being triggered; and
  execute the at least one operational command based on the data received from the one or more gaze detection sensors and based on the data received from the user interface.

According to another embodiment of this aspect, the peripheral electronic device further comprises at least one other user interface configured to trigger at least one operational command in response to interaction with a user, wherein the at least one operational command is associated with a current location at the screen of a cursor being a different cursor from the virtual gaze cursor.

In accordance with yet another embodiment, the movement of the cursor being different from the virtual gaze cursor, is carried out by detecting a two dimensional motion of the peripheral electronic device.

According to another embodiment, the system further comprises means to enable interaction between the user and the at least one user interface configured to trigger at least one operational command, when the user performs a gesture, or in response to a blink of the user's eye, or a head orientation and position of the user, or a voice command made by the user, or any combination thereof.

By still another embodiment, the virtual gaze cursor is presented at the screen in a graphical form being different from a graphical form at which the different cursor is presented at the screen.

In accordance with another embodiment, the virtual gaze cursor and the different cursor are operated independently of each other.

According to yet another embodiment, each of the at least one user interface and the at least one other user interface, is configured to trigger at least one operational command that cannot be triggered by the other one of these two user interfaces.

According to still another embodiment, each of the at least one user interface and the at least one other user interface is configured to trigger at least one operational command, and an operation to be executed by the computing device is based on a combination of two operational commands, each triggered by a different one of these two user interfaces.

In accordance with another embodiment, the virtual user interface associated with the gaze cursor is associated with a plurality of pre-defined operational commands.

By yet another embodiment, the system further comprises one or more timers for determining a period of time during which the user's gaze remains fixed at the virtual gaze cursor.

BRIEF DESCRIPTION OF THE DRAWINGS

For a more complete understanding of the present invention, reference is now made to the following detailed description taken in conjunction with the accompanying drawing wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Figure 1A:
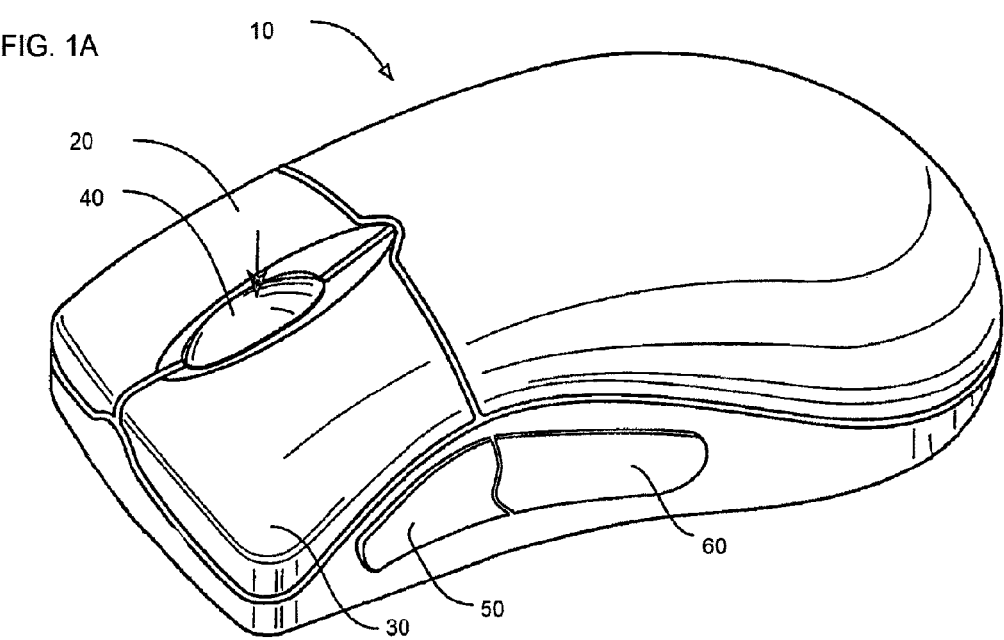
FIG. 1A—is a schematic view of a computer mouse construed in accordance with an embodiment of the present invention.
Figure 1B:
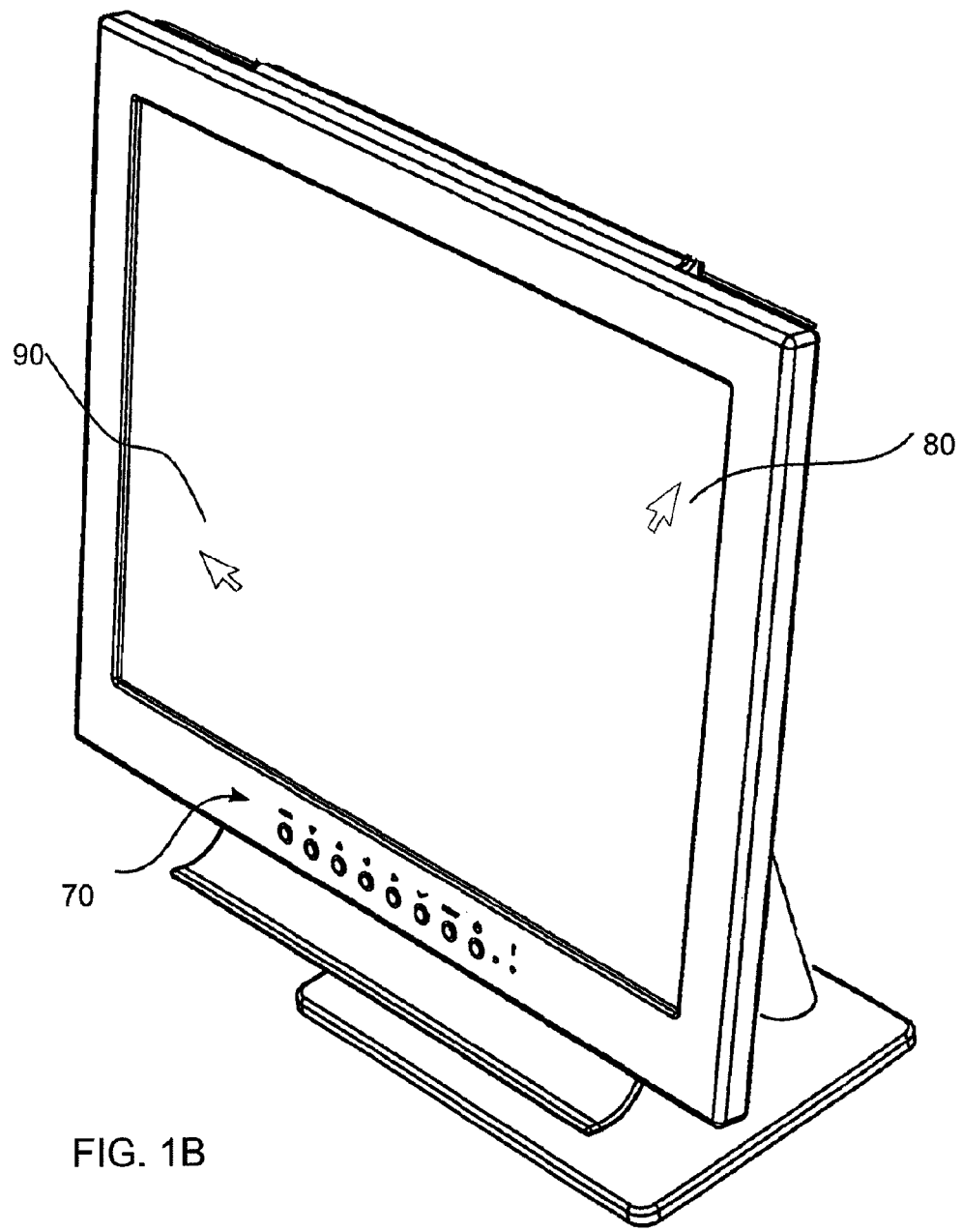
FIG. 1B—is a schematic view of a computer screen displaying two differently operated cursors in accordance with an embodiment of the present invention.

FIGS. 1A and 1B illustrate an example of one embodiment of the present invention, by which a peripheral device, in this example a computer mouse 10 illustrated in FIG. 1A, is provided with four push buttons, 20, 30 50 and 60. The mouse is connected to a computer system (not fully shown in FIGS. 1A and 1B) by any one of the methods known in the art per se, e.g. by wire where typical cabled mice use a thin electrical cord terminating in a standard connector, such as RS-232C, PS/2, ADB or USB, or cordless mice which transmit data via infrared radiation or radio (including Bluetooth). Buttons 20 and 30 which are standard user interfaces comprised in a computer mouse as well as wheel 50 are used for controlling the motion of a cursor (a pointer) illustrated in FIG. 1B, in two dimensions at screen 70, in accordance with the user's wishes, and initiating operational commands to be carried out by the computer system. The movement of cursor 80 is done by moving mouse 10, which in turn causes moving internal moving parts in a case of a mechanical mouse, or by moving the mouse relative to its underlying surface as in the case of an optical/laser mouse.

Clicking or hovering (stopping movement while the cursor is within the bounds of an area) can select files, programs or actions from a list of names, or through icons and other elements. For example, a text file might be represented by a picture of a paper notebook, and clicking while the cursor hovers over this icon might cause a text editing program to open the file in a window.

User interfaces 50 and 60 comprised in the same computer mouse 10 are buttons which are associated with a virtual gaze cursor 90, which is a different cursor from the standard cursor 80. According to an embodiment of the invention, virtual gaze cursor 90 is configured to move by essentially following the shifting of the user's gaze or by following the user's head orientation and position. The virtual gaze cursor may appear as identical to the standard cursor 80, or may have a specialized appearance—in order to differentiate it from cursor 90.

The functionality of the virtual gaze cursor may essentially be identical to the functionality achievable by using the standard mouse controlled cursor, i.e. having the same user experience. In the alternative, they virtual gaze cursor may be used to carry out at least some different functionalities from those carried out by the standard mouse controlled cursor.

Although screen 70 has been described in the present example as comprising the two concurrently operative different cursors 80 and 90, still, it should be noted that a virtual gaze cursor may operate as the only cursor being displayed at screen 70. However, in case the two cursors are simultaneously being displayed at the screen, their operation is preferably independent of each other so that they do not interact with each other.

As already explained above, the virtual gaze cursor can be moved by converting the user's gaze (or the user's head orientation and position in space) into a movement which the virtual gaze cursor should follow at the screen.

The user interface associated with the virtual gaze cursor, is demonstrated in FIG. 1A as two conventional push buttons 50 and 60 that are included in the standard mouse 10. In the alternative, one or two keys may be used in another peripheral device such as a keyboard, as the user interface associated with the virtual gaze cursor. This user interface (buttons 50 and 60) is associated exclusively with the virtual gaze cursor, and the buttons' functionality may correspond to the right click/left click buttons of a standard mouse, or be associated with different functionalities.

In addition or in the alternative, the user interface associated with the virtual gaze cursor may be activated by any one or more techniques including gesture, blink of an eye, head orientation and position, voice command, and the like.

In the description and claims of the present application, each of the verbs, "comprise" "include" and "have", and conjugates thereof, are used to indicate that the object or objects of the verb are not necessarily complete listing of members, components, elements or parts of the subject or subjects of the verb.

The present invention has been described using detailed descriptions of embodiments thereof that are provided by way of example and are not intended to limit the scope of the invention in any way. For example, although the peripheral device (the mouse) has been described as including two buttons associated with the visual gaze cursor, it should be understood that any other number (one, three etc.) can be used instead, as applicable. Also, these buttons are illustrated as being along the side of the mouse, but they can be located elsewhere. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A peripheral electronic device, comprising:
   a data interface configured to communicate with a computing device connectable to a display having a screen configured to concurrently display a virtual gaze cursor and a standard cursor;
   at least one user interface configured to trigger at least one first operational command in response to interaction with a user, wherein said at least one operational command is associated with a current location of the virtual gaze cursor at the screen, and a change of the current location of the virtual gaze cursor being displayed, is determined based on a shift of a user's gaze from a first location at said screen to a different location thereat, or based on a change in the user's head orientation and position, or based on any combination thereof; and
   at least one other user interface configured to trigger at least one second operational command in response to interaction with a user, wherein said at least one operational command is associated with a current location at the screen of the standard cursor, and a change of the current location of the standard cursor being displayed, is determined based on movement of the peripheral electronic device relative to an underlying surface.

2. The peripheral electronic device according to claim 1, wherein the movement of the standard cursor is determined by detecting a two dimensional motion of said peripheral electronic device relative to the underlying surface.

3. The peripheral electronic device according to claim 1, wherein triggering of the at least one first operational command in response to interaction with a user is based upon information derived from at least one of: a microphone configured to capture one or more voice commands, an image capturing device configured to capture one or more gestures of the user's hand, an image capturing device configured to capture one or more gestures of the user's finger, an image capturing device configured to capture one or more gestures of the user's head, an image capturing device configured to capture one or more gestures of the user's, and a timer configured to determine a period of time during which the user's gaze remained fixed at a certain location.

4. The peripheral electronic device according to claim 1, wherein said virtual gaze cursor is presented at the screen in a graphical form being different from a graphical form at which the standard cursor is concurrently presented at the screen.

5. The peripheral electronic device according to claim 1, wherein the virtual gaze cursor and the standard cursor are operated independently of each other.

6. The peripheral electronic device according to claim 1, wherein each of the at least one user interface and the at least one other user interface, is configured to trigger an operational command that cannot be triggered by the other one of said two user interfaces.

7. The peripheral electronic device according to claim 1, wherein each of the at least one user interface and the at least one other user interface is configured to trigger at least one operational command, and an operation to be executed by said computing device is based on a combination of two operational commands, each triggered by a different one of said two different user interfaces.

8. A system comprising:
a computing device connectable to a display having a screen configured to concurrently display a virtual gaze cursor and a standard cursor;
a data interface configured to communicate with a peripheral electronic device, wherein the peripheral electronic device comprises:
at least one user interface configured to trigger at least one first operational command in response to interaction with a user, and wherein the at least one operational command is associated with a current location of the virtual gaze cursor at the screen, and
at least one other user interface configured to trigger at least one second operational command in response to interaction with a user, wherein said at least one operational command is associated with a current location at the screen of the standard cursor;
one or more gaze detection sensors operative to determine a shift in a user's gaze or a change in the user's head orientation and position;
one or more processors operative to:
receive data from the one or more gaze detection sensors relating to the shift in a user's gaze to a new location at the screen or a change in the user's head orientation and position;
receive data from the user interface or from the at least one other user interface; and
execute said at least one first operational command or said at least one second operational command based on the data received from the one or more gaze detection sensors and based on the data received from the peripheral electronic device.

9. The system according to claim 8, wherein the movement of the standard cursor is determined by detecting a two dimensional motion of said peripheral electronic device relative to the underlying surface.

10. The system according to claim 8, wherein the one or more gaze detection sensors are further operative to trigger at least one third operational command by detecting a user performing a gesture, or a blink of the user's eye, or a change in the head orientation and position of the user, or a voice command made by said user, or any combination thereof.

11. The system according to claim 8, wherein said virtual gaze cursor is presented at the screen in a graphical form being different from a graphical form at which the standard cursor is concurrently presented at the screen.

12. The system according to claim 8, wherein the virtual gaze cursor and the standard cursor are operated independently of each other.

13. The system according to claim 8, wherein each of the at least one user interface and the at least one other user interface, is configured to trigger an operational command that cannot be triggered by the other one of said two user interfaces.

14. The system according to claim 8, wherein each of the at least one user interface and the at least one other user interface is configured to trigger at least one operational command, and an operation to be executed by said computing device is based on a combination of two operational commands, each triggered by a different one of said two different user interfaces.

15. The system of claim 8, wherein the user interface associated with the gaze cursor is associated with a plurality of pre-defined operational commands, different from the plurality of operational commands associated with the user interface associated with the standard cursor.

16. The system of claim 8, further comprising one or more timers configured to determine a period of time during which the user's gaze remains fixed at the virtual gaze cursor.

* * * * *